UNITED STATES PATENT OFFICE.

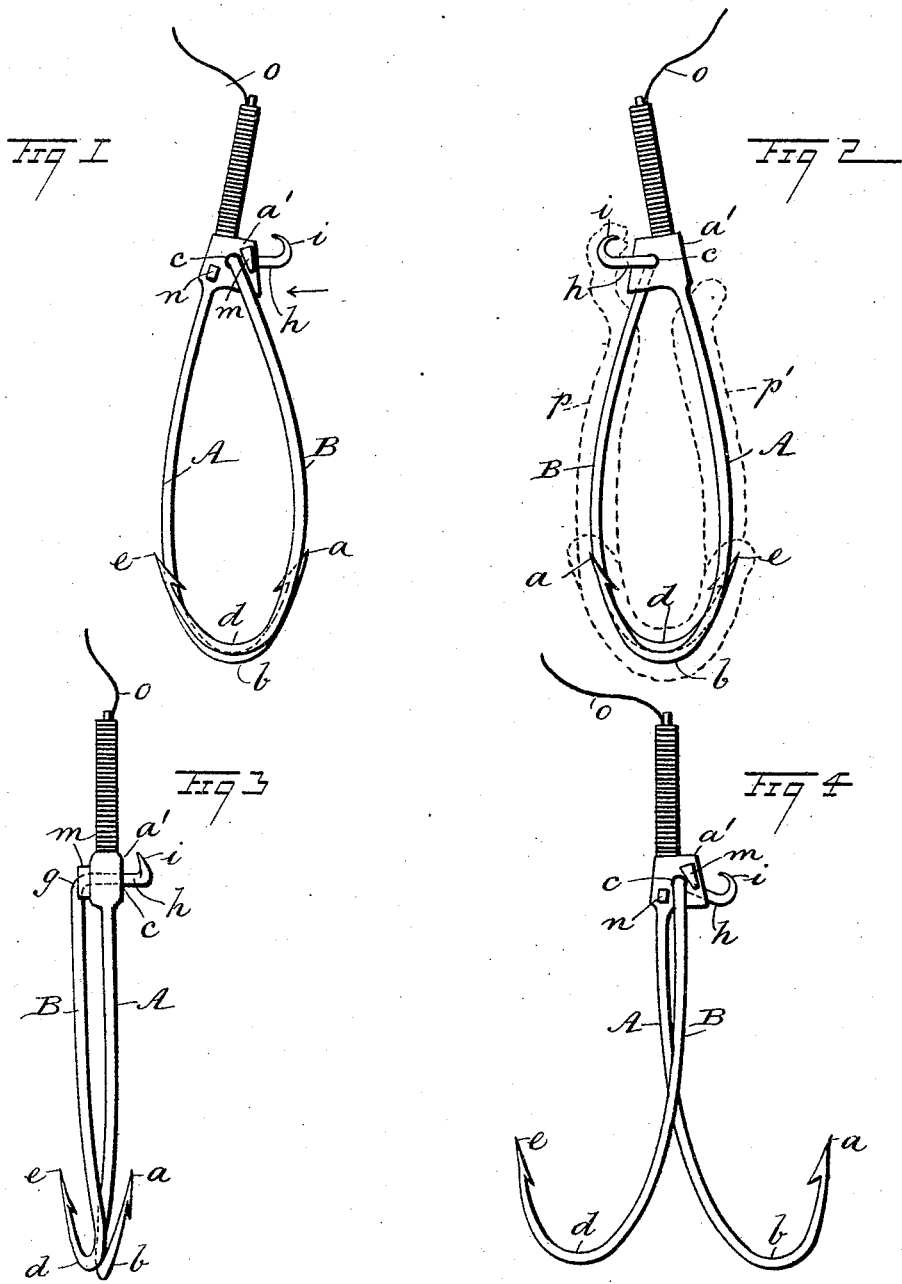

JOSEPH STRETCH, OF NEWARK, NEW JERSEY.

FISH-HOOK.

SPECIFICATION forming part of Letters Patent No. 444,656, dated January 13, 1891.

Application filed May 2, 1890. Serial No. 350,357. (No model.)

*To all whom it may concern:*

Be it known that I, JOSEPH STRETCH, of Newark, in the county of Essex and State of New Jersey, have invented a new and useful Fisk-Hook, of which the following is a full, clear, and exact description.

The object of this invention is to produce a fish-hook of the duplex type, which is simple in form, cheap to manufacture, and that will spread its duplicate hooks into position for engagement with the mouth of a fish when the bait is gripped and pulled upon by the fish.

To these ends my invention consists in certain features of construction and combination of parts, which are hereinafter described, and indicated in the claims.

Reference is to be made to the accompanying drawings, forming a part of this specification, in which similar letters of reference indicate corresponding parts in all the figures.

Figure 1 is a side elevation of the duplex hook in closed adjustment. Fig. 2 represents the opposite side of the fish-hook baited, the bait being shown in dotted lines. Fig. 3 is an edge view of the device viewed in the direction of the arrow in Fig. 1; and Fig. 4 is a side elevation of the fish-hook as it appears when the duplex hooks are spread apart.

As indicated, the fish-hook is composed of two portions. These are represented by the letters A and B in the drawings. The portion A is made of steel wire shaped as a fish-hook of well-approved form, barbed at $a$, as usual, the shank of this hook portion having an enlargement $a'$, formed on it at a suitable distance from the bow portion $b$. The enlargement $a'$ is designed to afford a loose support to the duplicate hook portion B, being laterally perforated at $c$ for this purpose. The lower portion of the piece B is furnished with a bow $d$ and barbed terminal $e$, of a shape which corresponds to that of the hook portion A. It will be seen, however, in Fig. 3 that the lateral "set" given the barbed ends of the portion A B is in opposite directions.

For the proper operation of the duplex hook it is necessary that the bows $b$ $d$ lie oppositely, or nearly so, when the parts are in closed adjustment, as shown in Figs. 1 and 2. To effect a rocking connection of the portion B with the piece A and provide a correct length for the shank of the portion B, a bend is made in said shank at $g$ near its upper extremity, so as to project the upper portion at a right angle to the shank-body and form a journal on the same, which journal is inserted through the perforation $c$ in the enlargement $a'$. After the parts A and B are loosely connected by the introduction of the journal portion of B into the perforation of the enlargement $a'$ the shank-body of the portion B is bent to align with the face of the enlargement which is opposite to the side it entered at, so as to provide a short limb $h$, that lies in a nearly horizontal plane when the entire device is in an upright position and the hook portions A and B in folded condition, as shown in Figs. 1 and 2. Upon the free pointed end portion of the limb $h$ a small curved hook $i$ is bent upwardly and returned toward the journal portion of the shank, for a purpose which will appear. A projection $m$ is formed on the side of the enlargement $a'$, near the orifice $c$, which is designed to have contact with the swinging hook portion B and prevent its improper divergence from the other portion A when the parts are folded together, as shown in Fig. 1, a similar projection or check-lug $n$ being provided to restrain all divergence of the hook portions in an opposite direction, as shown in Fig. 4. A proper length is given to the upper end portion of the piece A, which projects above the enlargement $a'$, whereon the cat-gut snell $o$ is looped in the usual manner.

As shown in Fig. 2, the bait $p$ $p'$ is applied in a peculiar way, the bait-piece $p$ being strung on the hook portion B by insertion of the barb $e$ at one end, the stringing being continued until the shank is fully covered, and at the upper end a sufficient portion of the bait-piece is extended to have a firm hooked engagement with the small curved hook $i$. The other hook portion A is similarly incased with the bait-piece $p'$, the terminal upper end of which lies near to the enlargement $a'$, care being taken to cover the barbed terminals of the duplex hook with the bait. Angle-worms, minnows, shrimps, or lampreys may be used for bait, or any other suitable material that is used on the ordinary hook.

In use, when the hook is baited, as shown in Fig. 2, and gripped by a fish that is of a size to take in its mouth the major portion of the bait, the seizure of the bait-piece $p$ and pull upon the same will rock the hook portion B, so as to spread the barbed ends of both portions A B, which will enter the walls of the mouth and secure the fish. The normal position of the hook portions A B is so baited as to completely mask the barbs on the same and present the bait in compact form, thus inviting fish of a shy nature to bite, and if the baited hook is seized a capture of the fish is the result, if the bait is in good condition and properly applied.

Having thus described my invention, what I claim as new, and desire to secure by Letters Patent, is—

1. In a fish-hook, two similar and jointed hook portions which have their bows adjacent and their barbs oppositely projected but concealed when in closed adjustment, one swinging hook portion being provided with a limb projected at right angles to a journal that is bent laterally from the body of this hook portion whereon it vibrates, and an integral curved small hook formed on the free end of the limb, substantially as set forth.

2. In a fish-hook, the combination, with a shank having a bow and a barb on one end portion and an enlargement on its body near the opposite end portion, which is laterally perforated, of a duplicate hook portion which is bent near its upper end laterally to engage loosely the hole in the enlargement and has a limb extended parallel to the enlargement and away from the barb on this hook portion, and an upwardly and inwardly curved hook on the end of this limb, substantially as set forth.

JOSEPH STRETCH.

Witnesses:
EMIL R. LUZ,
HENRY A. HEWSON.